United States Patent
Hatheway et al.

(10) Patent No.: US 7,925,570 B2
(45) Date of Patent: Apr. 12, 2011

(54) OPENING CROSS IN ELECTRONIC MARKET

(75) Inventors: Frank Hatheway, Chevy Chase, MD (US); Daniel F. Moore, New Haven, CT (US); Timothy E. Cox, Brooklyn, NY (US); Peter J. Martyn, Ridgewood, NJ (US); Dan B. Franks, Clearwater, FL (US); Adam S. Nunes, Brooklyn, NY (US); Timothy McCormick, Rockville, MD (US)

(73) Assignee: The Nasdaq OMX Group, Inc., Rockville, MD (US)

( * ) Notice: Subject to any disclaimer, the term of this patent is extended or adjusted under 35 U.S.C. 154(b) by 913 days.

(21) Appl. No.: 11/077,503

(22) Filed: Mar. 9, 2005

(65) Prior Publication Data

US 2006/0206404 A1    Sep. 14, 2006

(51) Int. Cl.
*G06Q 40/00*    (2006.01)
(52) U.S. Cl. .............. 705/37; 705/35; 705/36 R; 705/38
(58) Field of Classification Search .................... 705/35, 705/36 R, 37, 38
See application file for complete search history.

(56) References Cited

U.S. PATENT DOCUMENTS

| | | | | |
|---|---|---|---|---|
| 6,016,483 | A * | 1/2000 | Rickard et al. | 705/36 R |
| 7,162,447 | B1 * | 1/2007 | Cushing | 705/37 |
| 7,321,872 | B1 * | 1/2008 | Kaminsky et al. | 705/37 |
| 2002/0019795 | A1 * | 2/2002 | Madoff et al. | 705/37 |
| 2003/0046218 | A1 * | 3/2003 | Albanese et al. | 705/37 |
| 2003/0126065 | A1 * | 7/2003 | Eng et al. | 705/37 |
| 2003/0135443 | A1 * | 7/2003 | Moore et al. | 705/37 |
| 2003/0229563 | A1 * | 12/2003 | Moore et al. | 705/37 |
| 2005/0102218 | A1 * | 5/2005 | Sargent et al. | 705/37 |
| 2005/0289042 | A1 * | 12/2005 | Friesen | 705/37 |

* cited by examiner

*Primary Examiner* — Nga B. Nguyen
(74) *Attorney, Agent, or Firm* — Fish & Richardson P.C.

(57) ABSTRACT

A method, executed in a computer system, for opening an electronic market for trading of a security is described. The method includes receiving by the computer system eligible orders and quotes for the security traded in the electronic market and disseminating an order imbalance indicator indicative of predicted trading characteristics of the security at the open of trading. The method also includes determining by the computer system a price or prices at which the maximum shares would be executed and determining which price would minimize any imbalance of eligible orders and executing at least some of the eligible orders at the determined opening price.

27 Claims, 11 Drawing Sheets

OPENING CROSS IN ELECTRONIC MARKET

BACKGROUND

The invention relates to trading systems, particularly financial trading systems.

Electronic equity markets collect, aggregate and display trade information to market participants. Market participants initiate trades of securities by sending trade information to the electronic market on which the securities are traded. The trade information includes continuous orders for execution during a market trading session.

In a trading system or market, there exists the possibility that at the opening of trading, the volume and prices of buy orders will not balance the volume and prices of sell orders. This could occur for many reasons or for no apparent reason. For example, events may trigger buying or selling pressure in a particular security or the market in general. In addition, simple fluctuations in supply/demand could produce an imbalance at the opening.

In an electronic market that uses a dealer model, a lock/cross condition can exist at the opening. In a locked situation, a market participant enters a quote or order having a bid price that is the same as the best, i.e., lowest displayed offer or enters an offer price that is the same as the best, i.e. highest displayed bid quote price. In a crossed situation, the quote or order bid price for the security is higher than, i.e., crosses the offer quoted price, or conversely the quote or order has an offer price that is lower than the currently best displayed bid price. Locked/crossed conditions are undesirable for maintaining orderly markets.

SUMMARY

The opening process uses an auction mechanism for opening an electronic market. In the auction process, all eligible orders, may be used to open trading in a security. In addition, quotes of quoting market participants may also be used. The opening process executes an electronic clearing auction that incorporates the continuous market that precedes the opening process and the continuous market that will follow the opening process, as well as orders that are expressly entered for the auction.

According to an aspect of the present invention, a method, executed in a computer system, for opening an electronic market for trading of a security includes receiving by the computer system eligible orders and orders for the security traded in the electronic market and disseminating an order imbalance indicator indicative of predicted trading characteristics of the security at the open of trading. The method also includes determining by the computer system a price or prices at which the maximum shares would be executed and determining which price would minimize any imbalance of eligible orders and executing at least some of the eligible orders at the determined opening price.

The following are within the scope of the present invention, The eligible orders comprise market on open orders, limit on open orders and imbalance only orders, extended day orders, and Early and Late orders. The computer system determines whether the determined opening price is within a threshold amount of a benchmark price. The benchmark is a Volume Weighted Average Price ("VWAP") based on the market executions over the period from 9:29:55 to 9:30. If the determined price is outside the preset boundary of the benchmark, the market will change the determined price such that it is within the boundary. The computer system periodically calculates the order imbalance indicator over a series of time periods. The order imbalance indicator at a first of the series of time periods includes at least one of: an Inside Match Price, the number of shares paired at the Inside Match Price; order imbalance at the Inside Match Price; the buy/sell direction of that imbalance at the Inside Match Price, and an indicative clearing price range at which the market opening would occur if the market opening were to occur at that time and the percent by which that indicative price varies from the Inside Match Price.

After executing at least some of the orders, the computer system computes a new inside quote price based at least in part on prices of ECN quotes, and orders that do not participate in the opening. Computing a new inside quote includes determining by the computer system the new inside quote price based at least in part on prices of quotes ECN quotes, DAY and GTC orders that did not execute during the opening to add to those orders and quotes to the order book stored in the computer system.

The determined price is for selected securities in the market and for other securities the market uses a different opening method. The different opening method includes determining by the computer system all eligible orders for execution such that those orders would not lock or cross the market will be on a order book structure stored in the computer system and all other eligible orders will be an "In Queue" state queue stored in the system and executing by the computer system "In Queue" orders, including market orders, in strict time priority order regardless of order type. The different opening method includes activating by the computer system limit orders that have a time-in-force of Day or Good Till Canceled (GTC) and placing those limit orders whose limit price does not lock or cross the book on the order book with remaining orders whose limit price does lock or cross the book being placed in an "In Queue" state queue stored in the computer system in strict time priority and activating "reverse Pegged" orders and placing those reversed pegged orders whose limit price does not lock or cross the book on the order book stored in the computer system with remaining reversed pegged orders whose limit price does lock or cross the book being placed in an "In Queue" state queue stored in the computer system in strict time priority and activating regular Pegged orders in strict time priority to add shares of the security to the order book at the prices in the order book.

According to an additional aspect of the invention, a system that is part of an electronic market for trading of securities includes a client station for entering a opening order for a security traded in the electronic market, a server system including a computer readable medium for storing a computer program product, comprising instructions for causing the server system to receive eligible orders and quotes for the security traded in the electronic market, disseminate an order imbalance indicator indicative of predicted trading characteristics of the security at the open of trading, determine a price or prices at which the maximum shares would be executed and determining which price would minimize any imbalance of eligible orders, and execute at least some of the eligible orders at the determined opening price.

According to an additional aspect of the invention, computer program product resides on a computer-readable medium for use in an electronic market for trading of securities. The computer program product includes instructions for causing a system to receive eligible orders and quotes for the security traded in the electronic market, disseminate an order imbalance indicator indicative of predicted trading characteristics of the security at the open of trading, determine a price or prices at which the maximum shares would be executed and determining which price would minimize any imbalance of eligible orders, and execute at least some of the orders at the determined opening price.

One or more aspects of the invention may provide one or more of the following advantages. The opening cross provides a more robust open that allows for price discovery and an execution that results in an accurate and tradable opening price, in an electronic dealer market.

The opening cross can use a matching engine to algorithmically evaluate all eligible prices at which an opening cross can occur, identifies the price or prices at which the maximum shares would be executed, determines which price would minimize the imbalance of eligible orders and the single price that would minimize the difference in price from a determined opening crossing price to the final pre-opening market bid-ask midpoint. After the opening cross is completed a new inside quote is computed, since the market would at that point include other interest that was not reflected in the opening cross such as ECN quotes DAY and GTC orders. The opening cross determines whether the price discovery mechanism at the open functioned as expected. The opening cross includes process to protect against unusual occurrences The details of one or more embodiments of the invention are set forth in the accompanying drawings and the description below. Other features, objects, and advantages of the invention will be apparent from the description and drawings, and from the claims.

DETAILED DESCRIPTION

Figure 1:
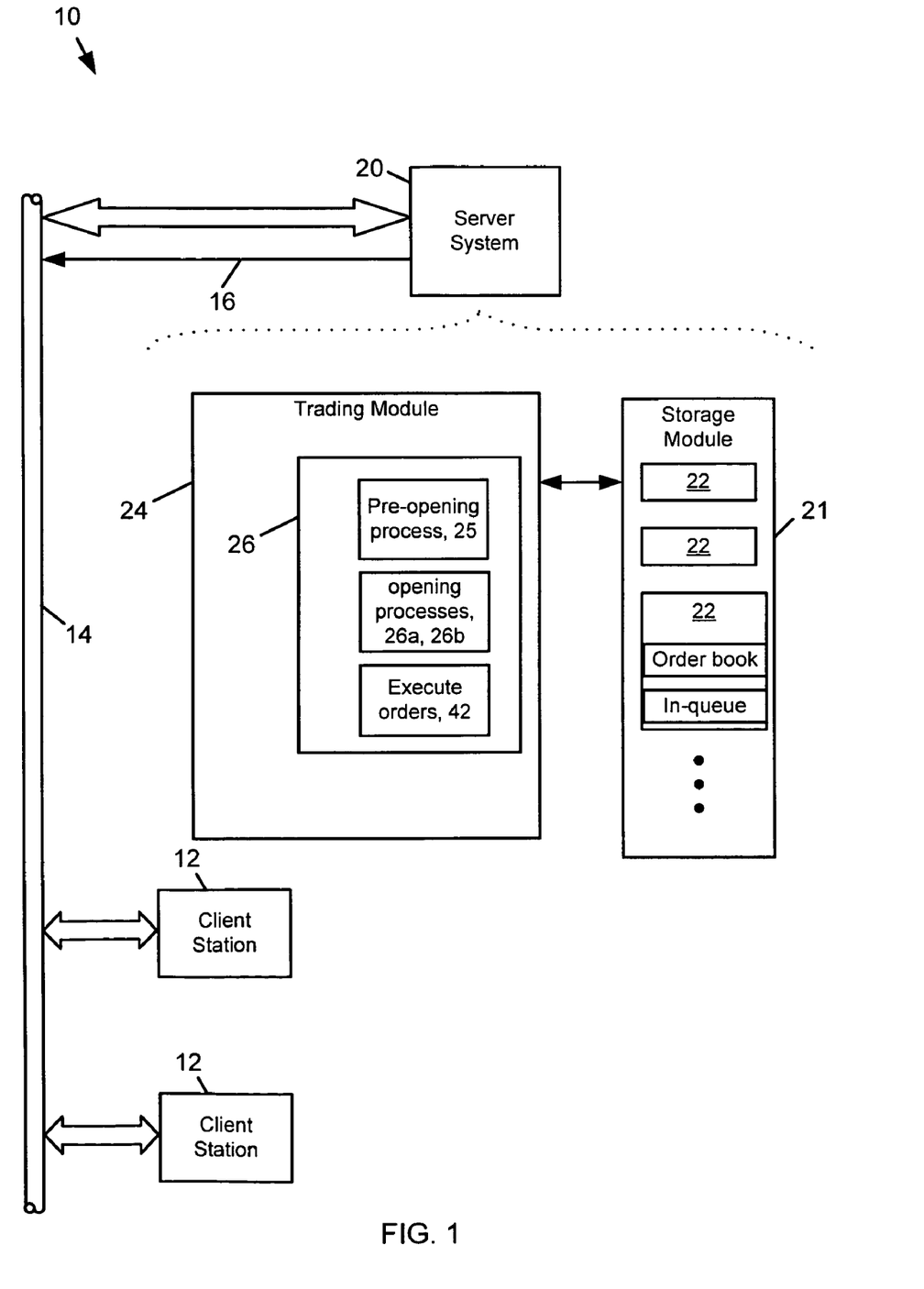
FIG. 1 is a block diagram of an electronic market for trading securities.

Referring to FIG. 1, an electronic market 10 is shown. The electronic market 10 includes client stations 12 in communication with a server system 20 over a distributed computing network 14 (e.g., the Internet, an intranet, a local area network, private network, or other similar form of network). A client station 12 includes a process to send trade information (e.g., continuous orders, opening orders, etc. discussed below) entered by a user (e.g., a market participant, a market maker, etc.) to the server system 20. The server system 20 collects trade information from the client stations 12 and enters valid orders into a storage module 21. An order identifies a security and a number of shares of the security to be traded. A priced buy order includes a bid price at which to buy the shares. A priced sell order includes an offer price at which to sell the shares. The storage module 21 includes a queue 22 for each security traded in the market 10 that stores orders for that security. Each queue 22 in the storage module will include an order book and In-Queue structures to maintain all eligible orders that would not lock or cross the market on the order book and all other eligible orders in "In Queue."

The server system 20 includes a trading module 24 that executes trades of securities electronically based on the entered orders. After an order is executed or canceled, the order is removed from the storage module 21. The trading module 24 also includes a pre-opening process 25 and one or more opening processes 26 that run prior to the commencement of a new trading session to determine an opening price for each security and executes at least some of the entered orders for a security at the determined opening price. The server system 20 disseminates information about the market on a data feed 16 (over the network 14 or, alternatively, over a separate communication line or network) to the client stations 12 and elsewhere.

In the electronic market 10, a user electronically trades with other users (as opposed to trading on a trading floor). Trading can occur over extended periods of time. An example of an electronic market, the Nasdaq Stock Market®, allows trading during a normal trading session (i.e., 9:30 a.m. to 4:00 p.m. ET). Orders placed and executed during the normal trading session are "continuous orders." The server system 20 maintains an "inside bid" price corresponding to the price of the best (i.e., highest) continuous buy order, and an "inside offer" price corresponding to the price of the best (i.e., lowest) continuous sell order, based on the most recently received continuous orders.

Figure 2:
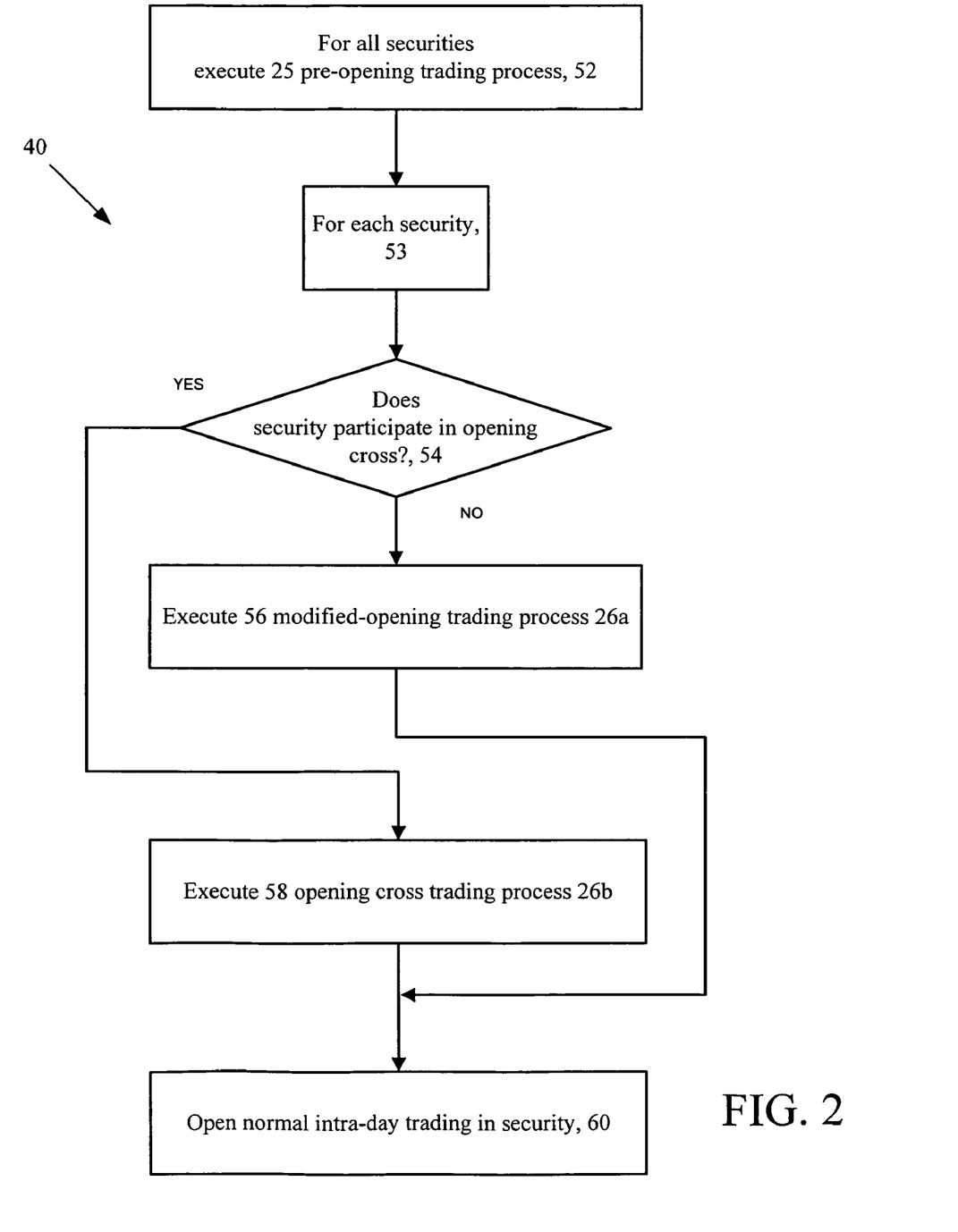
FIG. 2 is a flow chart that shows market opening process.

Referring to FIG. 2, a pre-open trading process 40 for an electronic market that trades in financial instruments, e.g., stock securities is shown. The market executes 25 a Pre-Open Trading process 52 (details shown in FIGS. 3A, 3B) to improve the pre-open trading environment for all market-listed securities. The pre-open environment eliminates the current "Trade-or-Move" process, opens all market participant quotes at 9:25 a.m., and provides extended hours order types for trading in a firm quote environment beginning at 9:25 a.m.

The market opening process 40 on a security basis 53 also determines 54 which of the two opening processes 26a, 26b to use for each of the securities. Thus, at e.g., 9:30 a.m., the official opening time of the market, the trading process 40 determines 54 if for a given security the security does not participate in an opening cross process, the process executes 56 a modified market opening 26a (FIGS. 4A-4B) or if the security does participate in an opening cross process, the process executes 58 a market Opening Cross 26b (FIG. 5A-5C), as will be discussed below. After execution of either opening 26a, 26b, the market opens 60 for normal intra-day trading for a new trading day in that security.

The modified market opening 26a (FIGS. 4A-4B) integrates quotes and orders entered during pre-market hours with orders designated for execution during the normal trading day (9:30 a.m. to 4:00 p.m.), provides an unlocked inside bid and offer and facilitates an orderly process for opening trading at 9:30 a.m.

For certain stocks designated by the market, the Opening Cross process 26b (FIGS. 5A, 5B) includes eligible orders. Eligible orders can include On Open and Extended Hours order types including Market-on-Open ("MOO"), Limit-on-Open ("LOO"), and Opening Imbalance Only ("OIO") orders, day orders, good till canceled (GTC) orders, immediate or cancel (IOC) orders, both Early and Late regular hours orders, and Extend Hours Day orders. In addition, market participant quotations, both display and reserve quotes can participate in the opening cross process 26b. The opening cross process 26b produces an opening order imbalance indicator that is disseminated via a market data feed, and a single-price opening cross process that will execute eligible orders at 9:30 a.m. The opening cross process 26b provides a robust opening that allows for price discovery, and executions that result in an accurate, tradable opening price.

Order Types

Orders placed prior to the commencement of a new trading session, i.e., prior to market open, and to be executed prior to or at the open of the trading session are "Opening Orders." Two types of opening orders are "On-Open Orders" orders and "Imbalance Only" (IO) orders. On-Open Orders can be un-priced and entered as "market-on-open" (MOO) orders, or priced and entered as "limit-on-open" (LOO) orders. A LOO buy order includes a buy limit price and a LOO sell order includes a sell limit price. On-Open Orders, both MOO and LOO orders, execute at the price determined by the opening process. Thus, LOO buy orders are subject to price improvement (i.e., reduction) if the buy limit price is greater than the determined opening price, and LOO sell orders are subject to price improvement (i.e., increase) if the sell limit price is less than the determined opening price. In one embodiment, On-Open Orders can be entered, cancelled, and/or corrected between 7:30: a.m. EST and 9:29:59 a.m., e.g., a few hours prior to market open and just prior to market open. On-Open Orders are not displayed or disseminated by the server system 20.

To reduce price volatility in the opening cross 26b discussed below, LOO orders submitted after 9:28:00 a.m. are designated "Late LOO," and are treated differently than those submitted before 9:28:00. LOO orders entered prior to 9:28:00 may have any limit price and may be cancelled anytime prior to 9:28:00 a.m. Late LOO Orders may only be submitted within a specified price range based on the last calculated Order Imbalance Indicator (discussed below). Late LOO Orders submitted outside the prescribed price range will be rejected. If there is a sell imbalance, Late LOO Orders to sell are priced no lower than the "near clearing price" (described below) or the LOO Orders will be rejected. Late LOO Orders to buy are priced no higher than the "inside match price" (also described below) or will be rejected. If there is a buy imbalance, Late LOO Orders to buy are priced no higher than the near clearing price and Late LOO Orders to sell are priced no lower than the inside match price or are rejected. Finally, if there is no imbalance, Late LOO Orders to buy are priced no higher than the inside match price and Late LOO Orders to sell are priced no lower than the inside match price or are rejected. Late LOO orders cannot be cancelled at any time for any reason, although their price can be improved or their share size increased.

Open Imbalance Only orders (OIO) orders execute only against an imbalance in liquidity, supplementing the liquidity provided by On-Open Orders. OIO order types are priced limit orders. The server system 20 enforces rules for entering or modifying submitted OIO orders. OIO sell (buy) orders that are priced more aggressively than the market inside ask (bid) before the open will be re-priced to the ask (bid) both for the purposes of the imbalance dissemination message and for executing on the opening cross. The OIO orders allow market participants to add liquidity to the market and help to ensure the execution of MOO and marketable LOO orders. OIO orders can be entered beginning at 7:30 a.m. until immediately before the market open. The entering firm cannot cancel these orders after a predetermined time, e.g., 9:28:00. Imbalance orders can be improved after the cancellation threshold and if improved will receive a new timestamp. OIO orders are neither displayed nor disseminated by the server system 20.

In addition to MOO, LOO, and OIO Orders, the Opening Cross executes against market participant quotations, both displayed and reserve size. The opening cross also executes against orders with a time-in-force of "Day," "good until cancelled (GTC), or "Immediate or Cancel" (IOC) that are entered prior to 9:28:00 (collectively "Early Regular Hours Orders"). Those Day, GTC, and IOC orders that are entered after 9:28:00 (collectively "Late Regular Hours Orders"), may participate in the Opening Cross only to the extent that there is available liquidity on the contra-side at the Opening Crossing Price. In addition, Extended Hours Orders are also execute against in the opening cross. After 9:28, all requests to cancel and cancel/replace Regular Hours Orders will be suspended. If those orders are not executed during the Opening Cross, the requests for cancellation will be processed.

The market includes the following order types for market-listed securities: the Extended Hours Day Order ("X Order") and the Extended Hours Immediate or Cancel ("IOX"). Members will be able to enter "X Orders" beginning at 7:30 a.m. on either an attributable or a non-attributable basis. Members include firms registered as Market Makers in the market, electronic commerce networks (ECNs) that maintain quotes in the market, Order Entry firms that enter anonymous order flow into the market. Exchanges with unlisted trading privileges (UTPs) would not be considered members, but by agreement could maintain quotes in the market and participate as well. "X Orders" will be available for execution beginning at 9:25 and continuing until the end of that trading day, currently 4:00:00 p.m. If not executed by that time, "X Orders" will be cancelled automatically from the system and returned to the entering party. IOX Orders are similar to conventional "Immediate or Cancel" ("IOC") Orders. An IOX Order is a priced order and if after entry into the market the order becomes non-marketable, the unexecuted portion is canceled and returned to the entering party. IOX Orders will only be available for entry and execution between 9:25 a.m. and 4:00 p.m.

The market can have other types of orders such as Day, IOC, and Good-till-Cancel ("GTC") orders. The time-in-force parameters those order types can be modified to make them ineligible for pre-opening processing. Those orders will still be available for entry at 7:30 but they will not be available for execution until 9:30.

Alternatively, "X" orders can be made enterable from 7:30 AM until 4:00 PM and executable from 8:00 AM until 4:00 PM. IOX orders can be enterable and executable from 8:00 AM until 4:00 PM. A new order Extended Hours Good till Canceled Order "GTX" orders will be enterable from 7:30 AM until 6:30 PM and executable from 8:00 AM until 4:00 PM. They will automatically be carried over to the next day until executed, canceled by the entering firm, or canceled by the system after one year.

Pre-Open Process

Figure 3A:
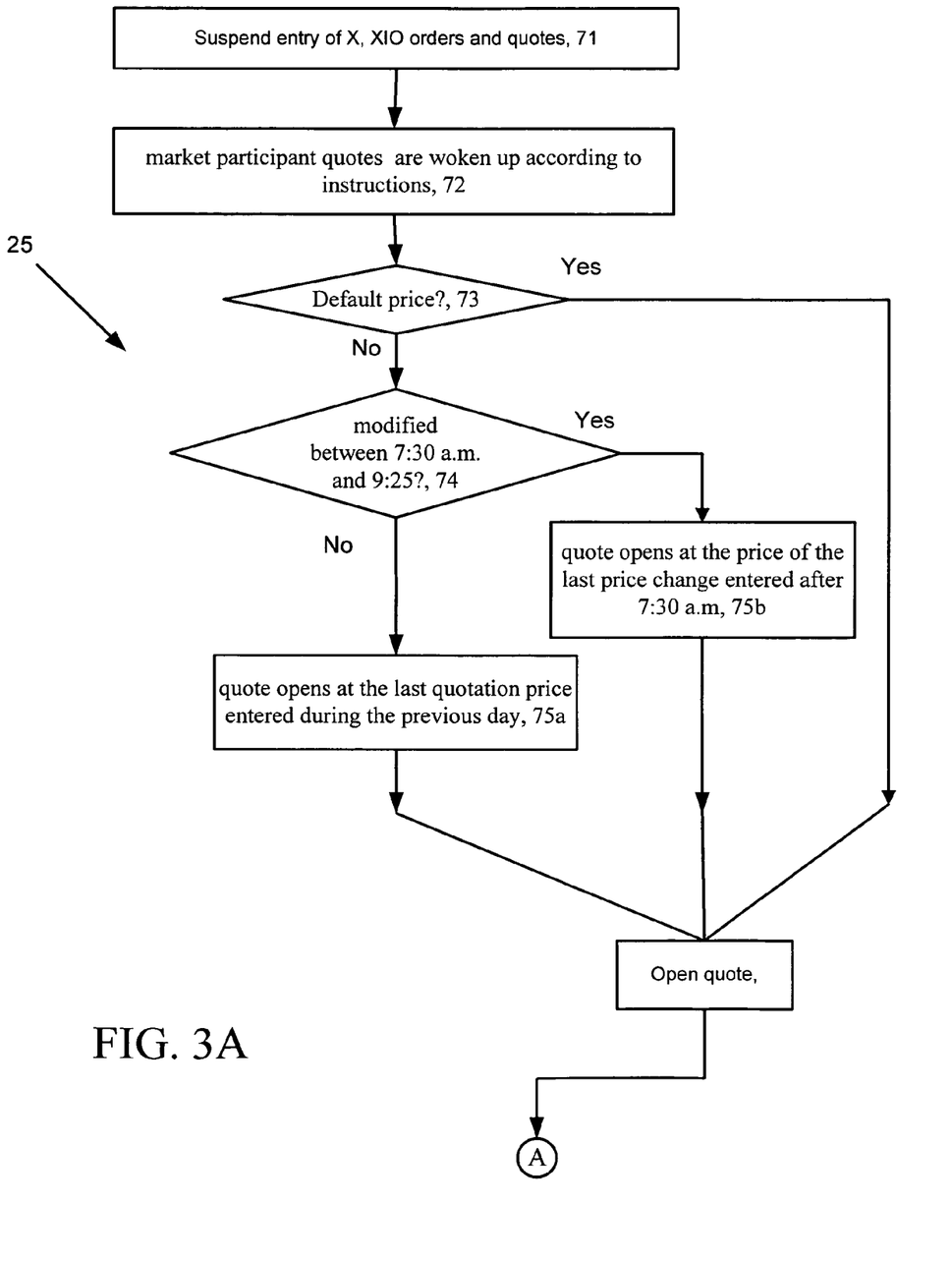
FIGS. 3A-3B is a flow chart that shows pre-opening process.
Figure 3B:
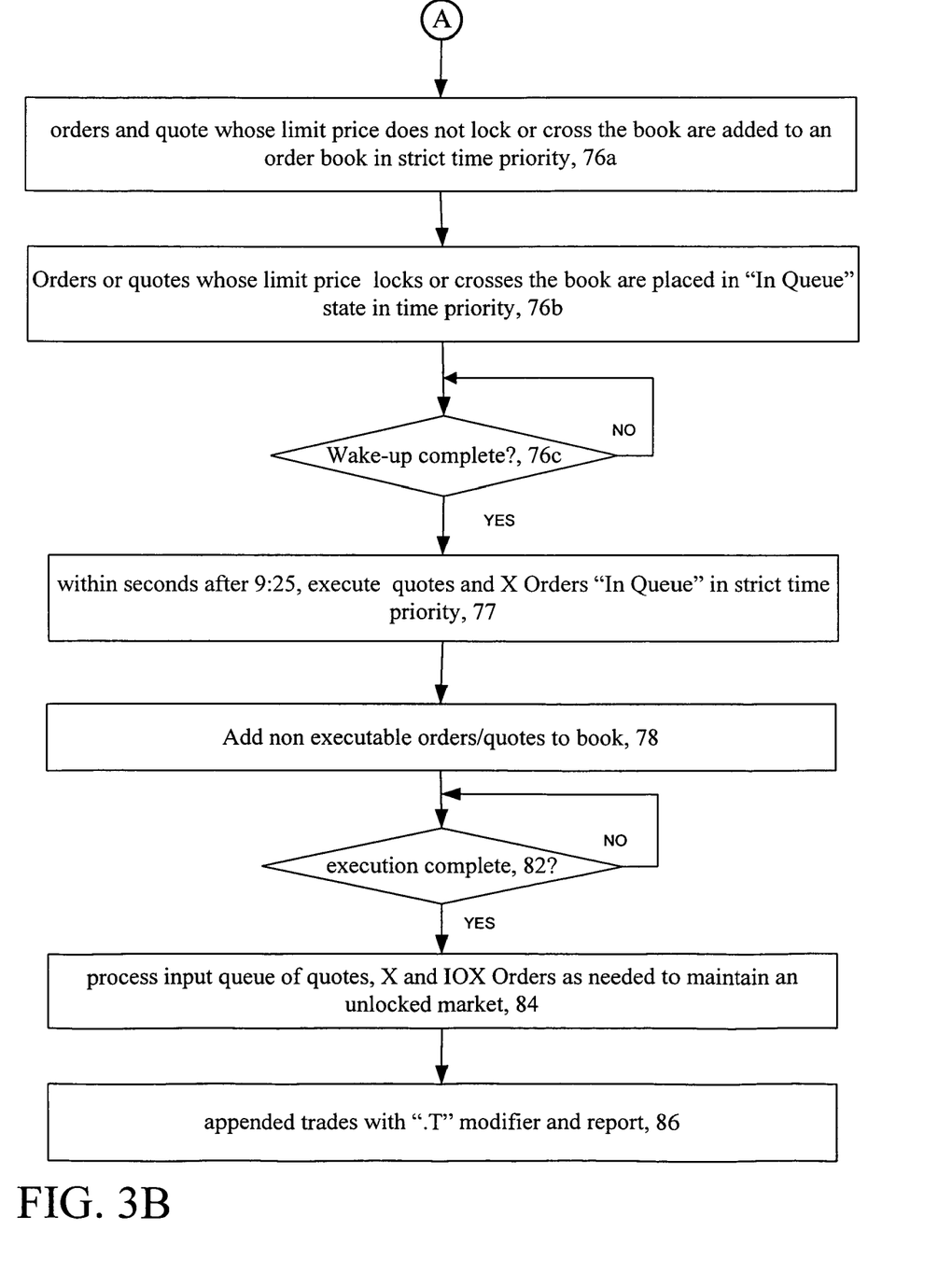

Referring to FIGS. 3A-3B, the pre-open trading process 25 that opens for display and execution of the X and IOX Orders and quotes is shown. In embodiments that use "GTX orders" the GTX orders would also be displayed and executable at this time as well. The pre-open trading process suspends 71 entry of all quotes and X or IOX Orders (and GTX orders if used) while the system is waking up and sorting quotes to clear locks and crosses. The pre-open trading process 25 will "Wake Up" 72 all open quotes and pre-trading eligible orders. To preserve and enhance price discovery that occurs prior to market open, the process wakes up (e.g., makes quotes and orders available for execution) all quotes and pre-opening eligible orders at 9:25, making those quotes and orders available for execution, while maintaining unlocked and uncrossed markets until the market open at 9:30.

The pre-open trading process 25 "wakes up" all market participant quotes and X limit orders. All market participant quotes are woken up 72 in accordance with each firm's instructions to the market.

The process determines if the quote entry firm indicated to have the quote open at default 73. The market allows the quote entry firm to automatically set the firm's bid and ask at the quote limits for the market. These quote limits are quotes that allow the firm to meet its legal obligations to maintain a two-sided quote, but to provide quotes that are generally non executable. For a market, such as the Nasdaq Stock Market, the market limits are $0.01 (bid) and $2,000 (ask). This permits quoting participants to maintain a two-sided quote, but not be actively seeking to supply liquidity at that time.

Firms can elect to carry quotes over from a prior trading day, as is, carry over only the display portion and cancel the reserve portion, or cancel the quote and not carry the quote over at all. Firms have several options for how their carryover quotes are opened at 9:25. The process determines if the quote was modified, 74. If the quote is not modified between 7:30 a.m. and 9:25 a.m., the quote opens 75a at the last quotation price entered during the previous day. If the firm's quote is modified between 7:30 a.m. and 9:25 a.m. that quote opens 75b at the price of the last price change "processed prior to 9:25".

Any order or quote whose limit price does not lock or cross the current market prices will be added 76a to an "order book" in strict time priority. Quotes are woken up in strict time priority to assure that a quote that did not lock or cross the market when entered, does not lock or cross the market when opened. Orders or quotes whose limit price would lock or cross the book will be placed in an "In Queue" state queue 76b also in time priority. These quotes are stored in a queue, waiting for the uncrossed inside to be established so they can either be executed or posted to the order book. Once the wake-up process has been completed, 76c within seconds after 9:25, the market will begin executing 77 quotes and X Orders that were held "In Queue" in strict time priority regardless of quote or order type. Those "X orders" that are not executable are added 78 to the order book. "In Queue" quotes and orders that are not executable will be added 80 to the order book. Once this process is complete 82, the system will resume processing 84 the input queue of quotes, X Orders as needed to maintain an unlocked market. All trades that are executed prior to 9:30 will be considered as executed outside of regular trading hours and will be appended 86 automatically with the ".T" modifier, as they are today between 9:29:30 and 9:30.

The pre-open trading process can be used for all market-listed securities. The pre-open trading process improves price discovery, permits executions, and minimizes the occurrences and duration of locked and crossed markets leading into the open of the normal trading day. The pre-open trading process avoids use of the conventional "Trade-or-Move" process and instead provides pre-opening eligible orders and opening quotations and pre-opening eligible orders at 9:25 a.m. rather than 9:29:30. The pre-open trading process can be used for market listed securities, including those that will not participate in the Opening Cross discussed below.

The conventional Trade-or-Move process is set forth in SEC Rule 4613(e)(1)(C). While the Trade-or-Move process reduces instances and duration of locked and crossed markets prior to the market open and generally improves the quality of the opening, the Trade-or-Move is overly complex to program, administer, and comply with. In addition, the usefulness of Trade-or-Move is less in markets that use an automated unlocking and uncrossing process. In such situations, the automated process ensures an unlocked market at or shortly after 9:29:30, and thus, the primary function of Trade-or-Move has been reduced to maintaining unlocked markets prior to 9:29:30 when market participants' quotes are still closed. By moving the unlocking process from 9:29:30 to 9:25 and opening quotations at that time provides all of the advantages that conventional Trade-or-Move process currently offers to maintaining unlocked and uncrossed markets, while providing a simpler and more efficient mechanism that also permits price discovery.

Modified Opening Process

In some embodiments of a market, not all of the market's securities participate in the Opening Cross process discussed below. Participation in the Opening Cross process can be based on trading volume for a particular security and the likelihood that there would be sufficient crossing order flow to make the Opening Cross possible for that security. For those securities that do not participate, those securities are subject to an opening procedure that ensures that all stocks open with an unlocked inside market. This procedure is available to all securities. The opening process "wakes up" orders that are eligible for execution beginning at 9:30, and process those orders in an orderly fashion to prevent the locked and crossed markets.

Figure 4A:
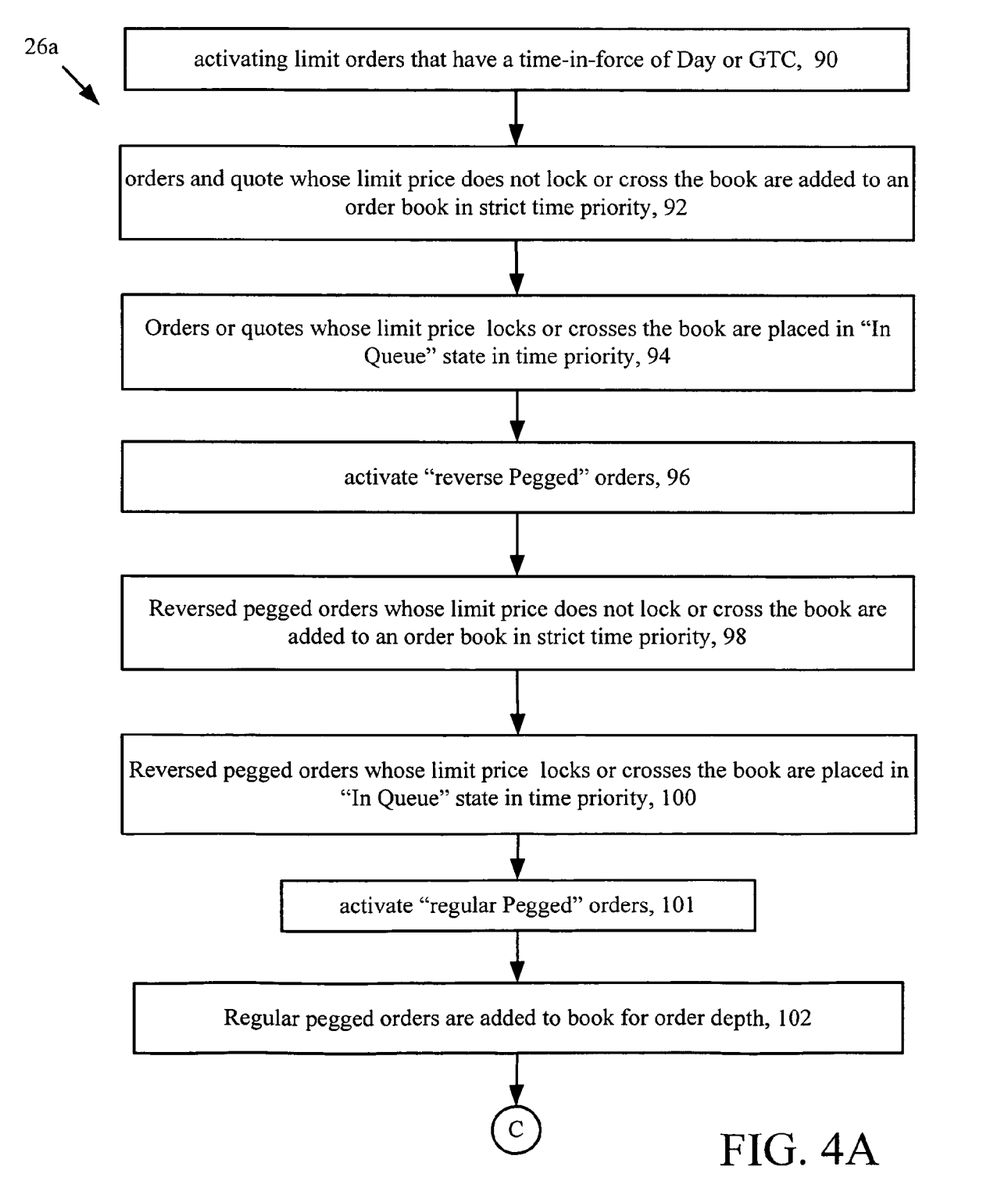
FIGS. 4A-4B is a flow chart that shows a modified opening process.
Figure 4B:
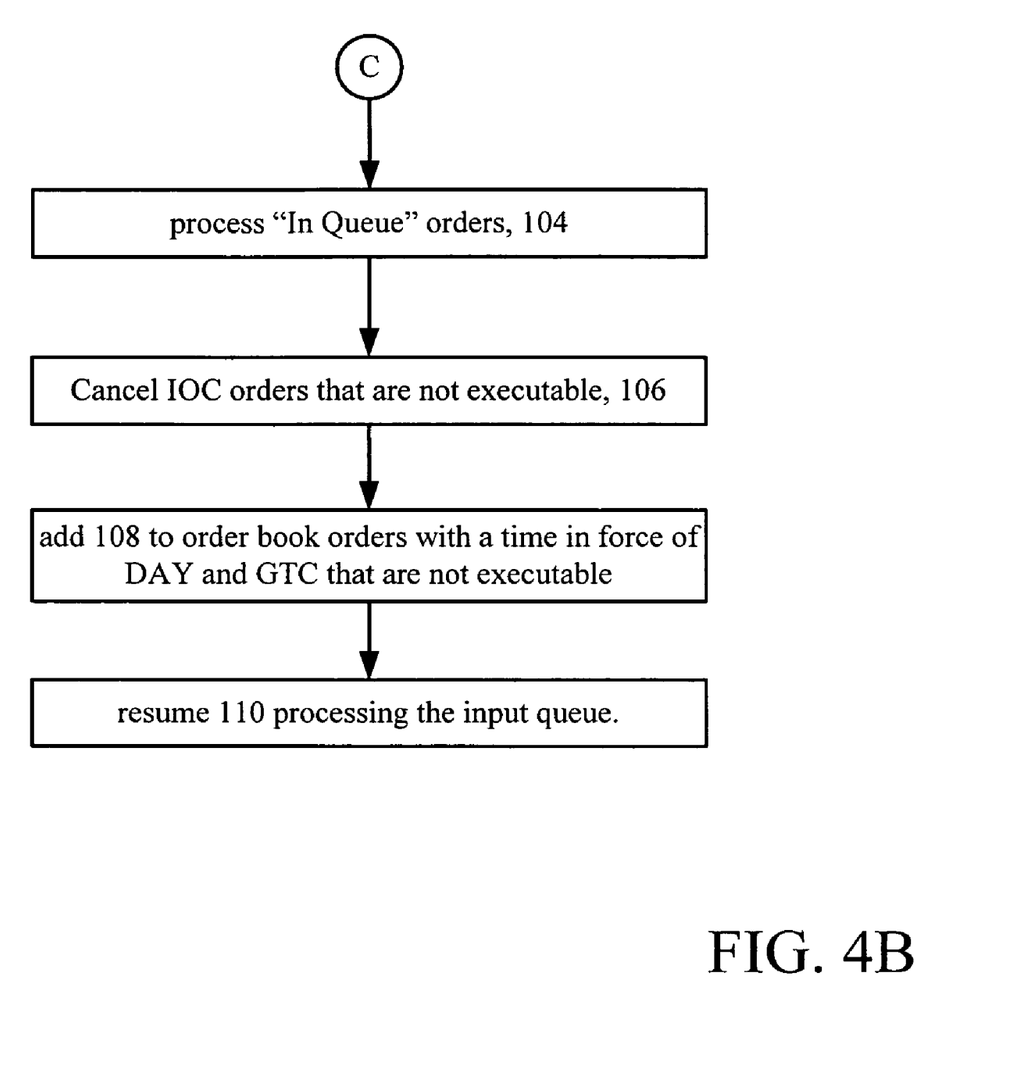

Referring to FIGS. 4A-4B, the modified opening process 26a "wakes up," (i.e., makes all of those orders eligible for execution,) all eligible orders such that all orders that would not lock or cross the market will be on the market book and all other eligible orders will be an "In Queue" state. The modified opening process 26a in one embodiment accomplishes this by activating 90 limit orders that have a time-in-force of Day or GTC. Those limit orders whose limit price does not lock or cross the book will be added 92 to the book. Orders whose limit price does lock or cross the book will be placed 94 in an "In Queue" state in strict time priority. The process activates 96 "reverse Pegged" orders.

Reverse pegged orders are orders entered on one side (Buy/Sell) that are priced 1 penny away from the quote on the other (Offer/Bid). A reverse pegged Sell order would be priced 1 penny higher than the current bid, so any buy order priced higher than the Bid would automatically execute it. A reverse pegged Buy works the opposite, being priced 1 penny below the offer to execute any sell that is priced lower than the offer. If the price provided by the reverse Pegged order does not lock or cross the book, the order will be placed on the book 98. If the price produced by the reverse Pegged order would lock or cross the book, the order will be placed in "In Queue" status 100.

The process 26a activates 101 regular Pegged orders in strict time priority and adds 102 the regular Pegged orders to the order book. Since these orders can only join the current highest bid or lowest offer price level, they add depth to the book at that price. The In Queue orders also include market and IOC orders in strict time priority. At this point, all eligible orders that would not lock or cross the market will be on the order book and all other eligible orders will be In Queue.

After the wake-up process has been completed, the system will process 104 the "In Queue" orders, including market orders, in strict time priority order regardless of order type. IOC orders that are not executable will be canceled 106. Orders with a time in force of DAY and GTC that are not executable will be added 108 to the book in strict time priority. Once this process is complete, the system will resume processing 110 the input queue.

Order Imbalance Indicator ("OII")

Figure 4C:
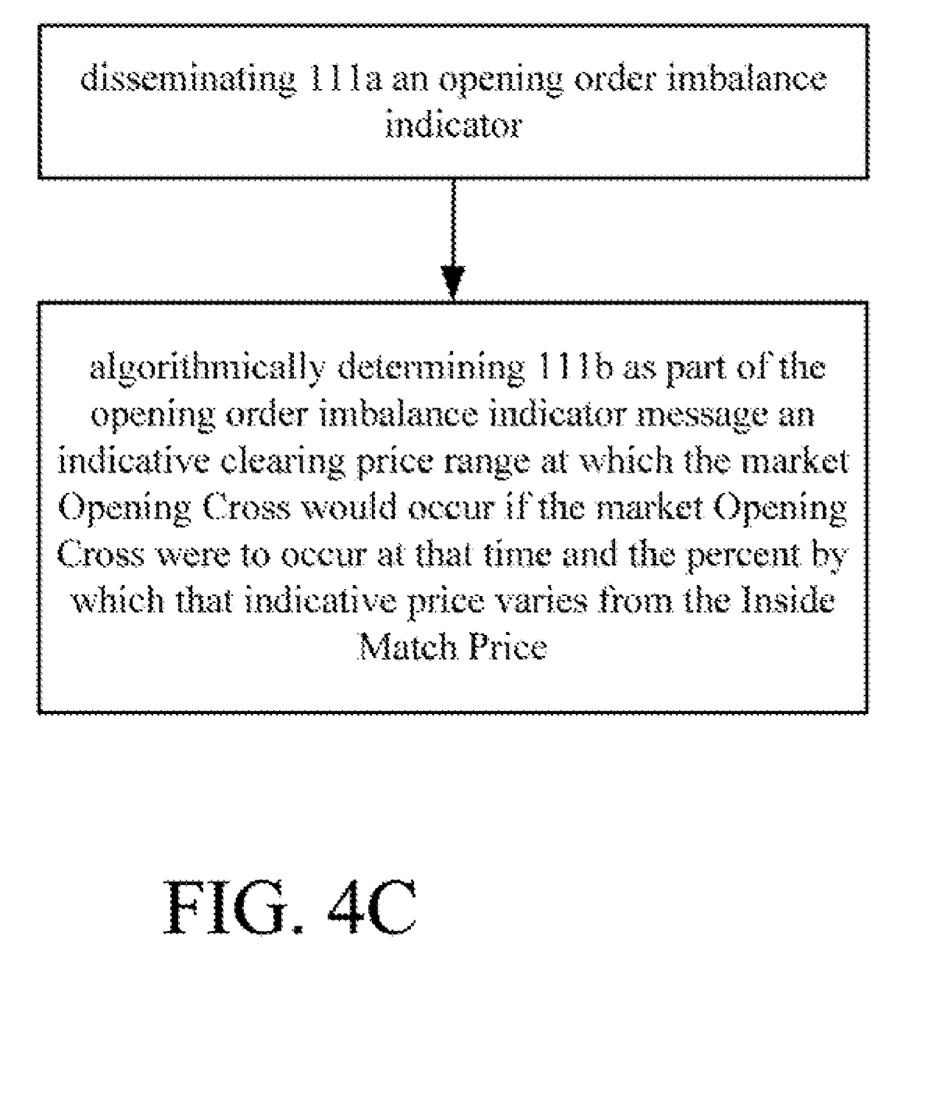
FIG. 4C is a flow chart that shows disseminating of an opening order imbalance indicator.

Referring now to FIG. 4C. at 9:28 a.m. the market begins disseminating 111a an opening order imbalance indicator message on one or more market data feeds. Although the Opening Cross will occur at 9:30, the order imbalance indicator is disseminated to give participants insight into the state of the book and the opening cross if it were to take place at the time of the dissemination of the imbalance indicator. The opening order imbalance indicator message adds transparency to the market and encourages market participants to add liquidity to the market prior to the open.

The opening imbalance information includes the Inside Match Price, which is determined to maximize the number of paired shares of MOO, LOO, OIO and Early Regular Flours orders, and minimizes any imbalance and divergence from the pre-opening continuous market. In addition, the opening order imbalance indicator message includes the number of shares represented by MOO, LOO, OIO and Early Regular Hours orders that are paired at the Inside Match Price; the MOO, LOO, and Early Regular Hours orders imbalance at the Inside Match Price; and the buy/sell direction of that imbalance at the Inside Match Price. The market determines algorithmically 111b and also disseminates as part of the opening order imbalance indicator message an indicative clearing price range at which the market Opening Cross would occur if the market Opening Cross were to occur at that time and the percent by which that indicative price varies from the Inside Match Price. The indicative clearing price range is bounded on the far side by the price at which all MOO, LOO, OIO, and Early Regular Hours orders would cross with only each other (termed "far clearing price"). It is bounded on the near side by the price at which the MOO, LOO, OIO Early Regular Hours orders, Extended Hours Orders and Quotes would clear (termed "near clearing price"). Where no clearing price exists, the market disseminate an indicator for "market buy" or "market sell."

The market disseminates the opening order imbalance indicator message, via proprietary data feeds to subscribers and via the Internet, and so forth. The indicator will be disseminated beginning at 9:28:00 and at more frequent intervals as the time to market open decreases, e.g., every 15 seconds beginning at 9:28 and every 5 seconds beginning at 9:29 until market open.

For example, if the market Opening Book had the following orders:

| Buy Orders | | | | Sell Orders | | | |
|---|---|---|---|---|---|---|---|
| Entry Time | Type | Size | Price | Entry Time | Type | Size | Price |
| 9:24:00 | IOC | 8000 | Market | 8:29:00 | OO | 1000 | 19.99 |
| 9:24:00 | OO | 1000 | 19.99 | 9:18:00 | Quote | 5000 | 20.01 |
| 8:40:00 | OO | 4000 | 19.97 | 8:40:00 | OO | 1000 | 20.02 |
| 9:22:00 | IO | 500 | 19.97 | 8:30:00 | Quote | 10000 | 20.04 |
| 9:22:00 | Quote | 2000 | 19.97 | | | | |

The OII information disseminated would be:

1,000 shares paired, 7,000 share buy imbalance at $20.01
Indicative Prices: MKT BUY far clearing price, $20.04 near clearing price.

Similarly, if the market had the following orders:

| Buy Orders | | | | Sell Orders | | | |
|---|---|---|---|---|---|---|---|
| Entry Time | Type | Size | Price | Entry Time | Type | Size | Price |
| 9:24:00 | IOC | 8000 | Market | 8:29:00 | OO | 1000 | 19.99 |
| 9:28:20 | OO | 5000 | 20.04 | 9:18:00 | Quote | 5000 | 20.01 |
| 9:24:00 | OO | 1000 | 19.99 | 8:40:00 | OO | 1000 | 20.02 |
| 8:40:00 | OO | 4000 | 19.97 | 8:30:00 | Quote | 10000 | 20.04 |
| 9:22:00 | IO | 500 | 19.97 | 9:28:10 | OO | 10000 | 20.05 |
| 9:22:00 | Quote | 2000 | 19.97 | | | | |

Figure 5A:
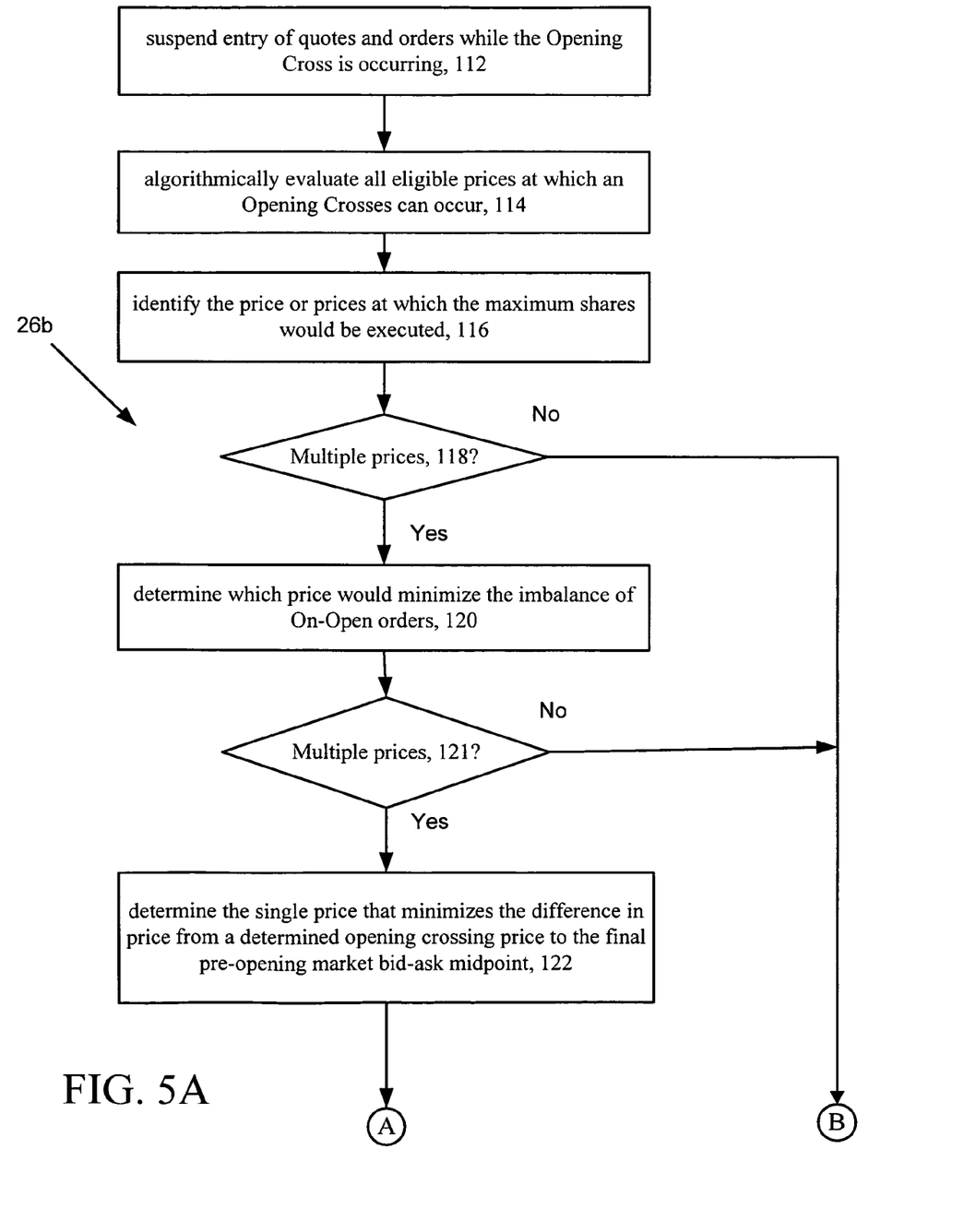
FIGS. 5A-5C is a flow chart that shows an opening cross process.
Figure 5B:
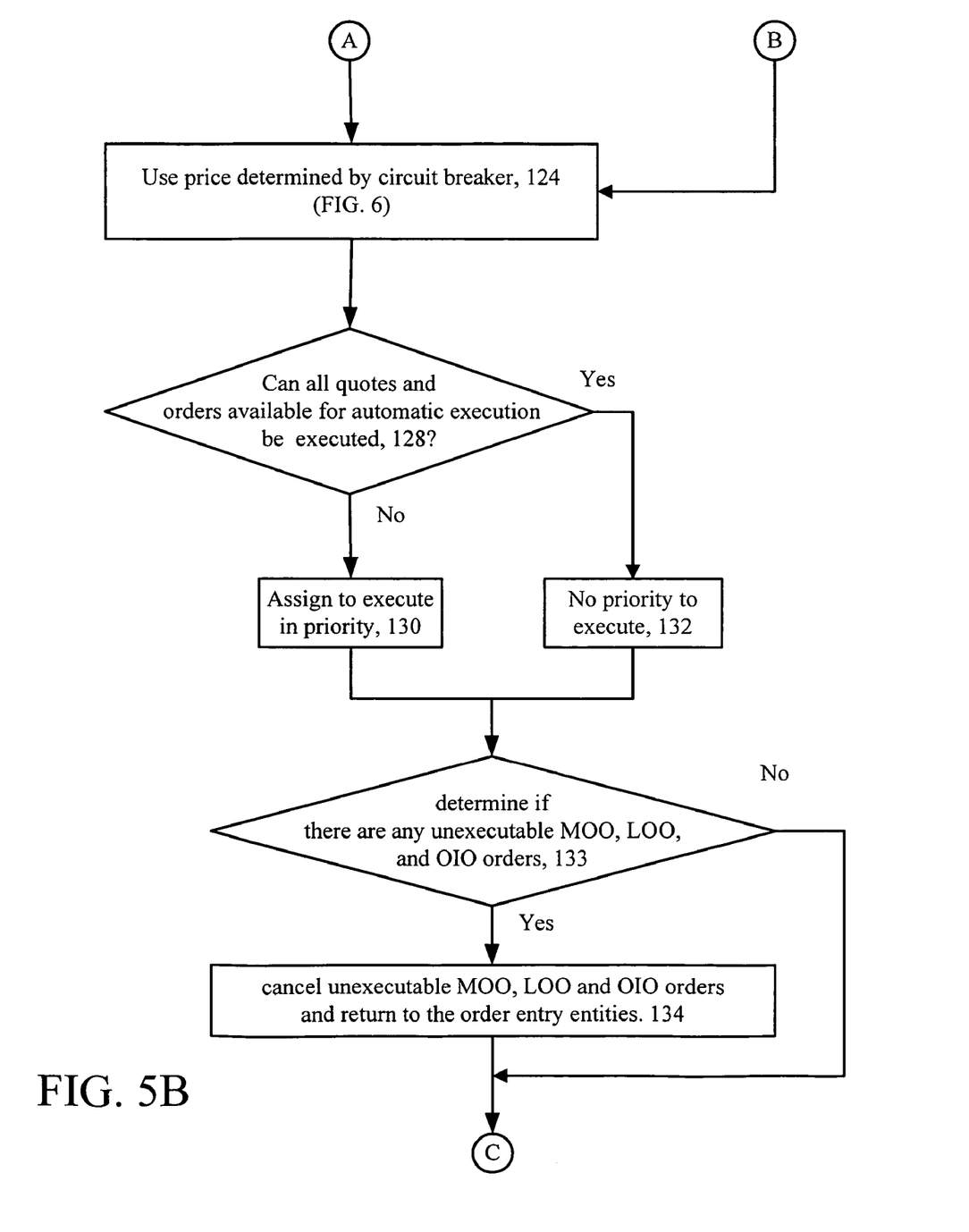
Figure 5C:
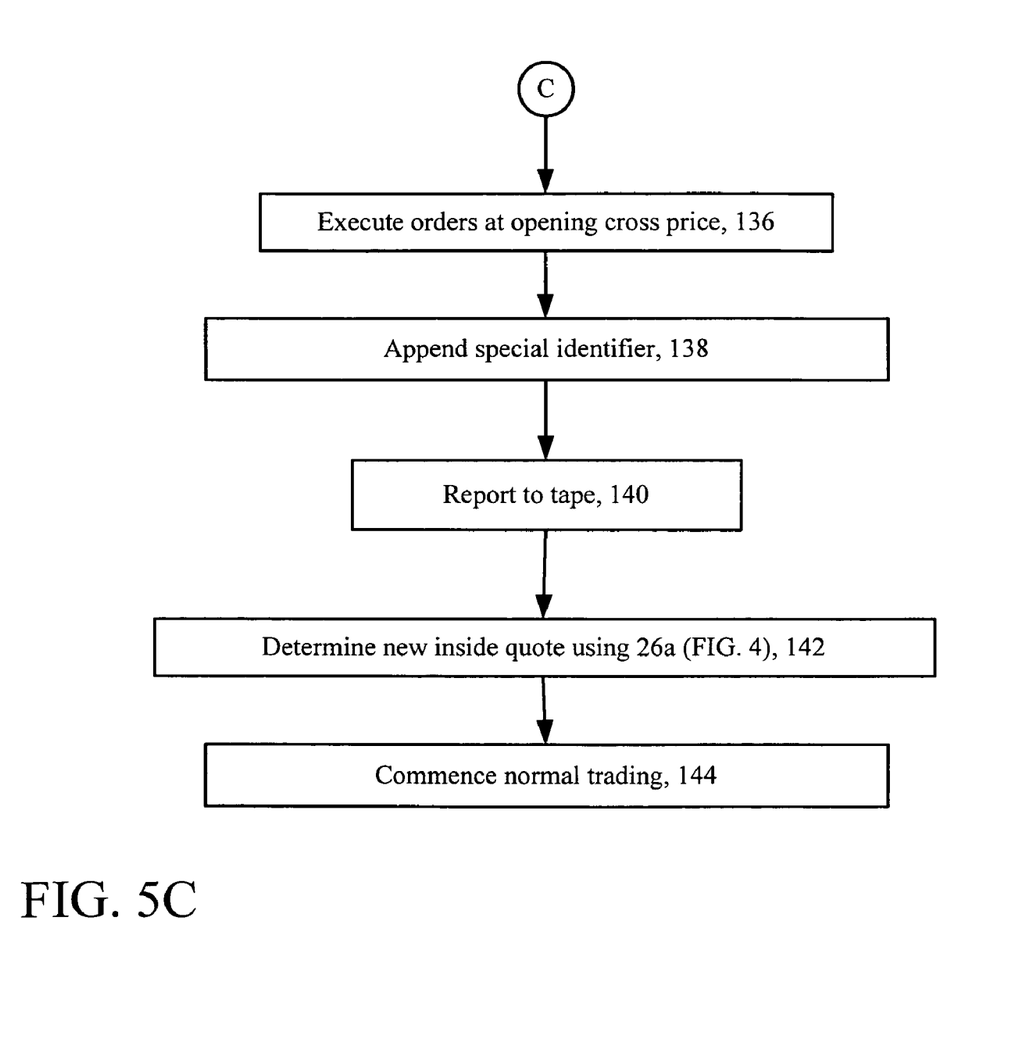

The OII information disseminated would be:

1,000 shares paired, 12,000 share buy imbalance at $20.01
Indicative Prices: 20.05 far clearing price, $20.04 near clearing price Referring to FIGS. 5A-5C, the market Opening Cross process 26b is shown. While the opening cross 26b is occurring, entry of quotes and orders is suspended 112. The opening cross process 26b uses a matching engine to algorithmically evaluate 114 all eligible prices at which an Opening Crosses can occur. The matching engine identifies 116 the price or prices at which the maximum shares would be executed without trading through an eligible limit order. If more than one price can result in the same number of shares being executed 118, the matching engine will evaluate those prices only and determine 120 which price would minimize the imbalance of On-Open orders. If more than one price still qualifies 121, the matching engine determines 122 the single price that would minimize the difference in price from a determined opening crossing price to the final pre-opening market bid-ask midpoint. The market opening cross process attempts to maximize the MOO, LOO, OIO, and Early Regular Hours orders and executable quotes and orders in the Nasdaq Market Center to be executed; minimizes the Imbalance of such shares; and minimizes the difference in opening price from the final pre-opening Nasdaq bid-ask midpoint. The opening cross process 26b uses 124 the price determined by a circuit breaker process. That is, the process 26b determines if the market opening cross price should be selected.

If the market Opening Cross price is selected as the opening price, and fewer than all quotes and orders that are available for automatic execution in the market would be executed 128, the process will execute quotes and orders in a determined priority 130. Otherwise, the process will execute 132 the quotes and orders.

One exemplary priority is to first execute MOO and Early Regular Hours market orders, with time as the secondary priority. After these orders have been exhausted, the opening cross process will execute LOO orders, Early Regular Hours limit orders, OIO orders, X limit orders, participating displayed quotes and reserve interest that is priced more aggressively than the determined market Opening Cross price with time as the secondary priority. In some embodiments, only participating displayed quotes are executed at this time, since ECN quotes are displayed but do not participate in the opening cross because ECNs generally do not participate in auto-execution of orders.

After these orders have been exhausted, the process executes LOO orders, OIO orders, displayed interest of Early Regular Hours and X limit orders, displayed interest of limit orders, and displayed interest of participating quotes at the market Opening Cross price with time as the secondary priority. The next set of priority is for reserve interest of participating quotes and Early Regular Hours and X limit orders at the market Opening Cross price with time as the secondary priority. After that interest has been exhausted, the process executes Late Regular Hours orders in strict price/time priority.

The process determines 133 if there are any unexecuted MOO, LOO, and OIO orders, and if there are any the process cancels 134 those orders and returns them to the order entry entities.

At the market open, e.g., 9:30, the Opening Cross occurs. All orders that are executable will be executed 136 at the market Opening Cross price, reported in the market's trade reporting system. A special market maker identifier is appended 138 for the contra parties to report the trade. For the Nasdaq Stock Market, the indicator is "SIZE" as the contra party on both sides of the trade. Other systems can use other market maker identifiers or no identifiers to report the trade. The market Opening Cross price and the associated paired volume is transmitted 140, e.g., to the consolidated tape and disseminated to other data feeds, e.g., the UTP Trade Data Feed ("UTDF") as a bulk print, the Nasdaq Index Dissemination Service ("NIDS") and the Nasdaq Application Program Interface as the Nasdaq Official Opening Price ("NOOP"). Other markets could use other dissemination services.

After the Opening Cross process is completed, the process calls 142 the Modified Open Process 26a (FIGS. 4A-4B) to compute a new inside quote, since the market would at that point include ECN quotes that do not participate in the Opening Cross process, and would also include DAY and GTC orders that did not execute during the Opening Cross process 26b that also need to be added to the order book and quoted. Thereafter normal trading commences 144.

To illustrate the Opening Cross, if the market contained the following orders at

| Buy Orders | | | | Sell Orders | | | |
|---|---|---|---|---|---|---|---|
| Entry Time | Type | Size | Price | Entry Time | Type | Size | Price |
| 9:24:00 | IOC | 8000 | Market | 8:29:00 | OO | 1000 | 19.99 |
| 9:28:20 | OO | 5000 | 20.04 | 9:29:54 | OO | 20000 | 19.99 |
| 9:29:57 | Quote | 5000 | 20.03 | 9:29:58 | OO | 10000 | 19.99 |
| 9:24:00 | OO | 1000 | 19.99 | 8:40:00 | OO | 1000 | 20.02 |
| 8:40:00 | OO | 4000 | 19.97 | 8:30:00 | Quote | 10000 | 20.04 |
| 9:22:00 | OIO | 500 | 19.97 | 9:28:10 | OO | 10000 | 20.05 |
| 9:22:00 | Quote | 2000 | 19.97 | | | | |

The Opening Cross would occur at $19.99 with 19,000 shares crossed. The inside market after the cross would be 19.97 (bid) and 20.04 (ask).

Figure 6:
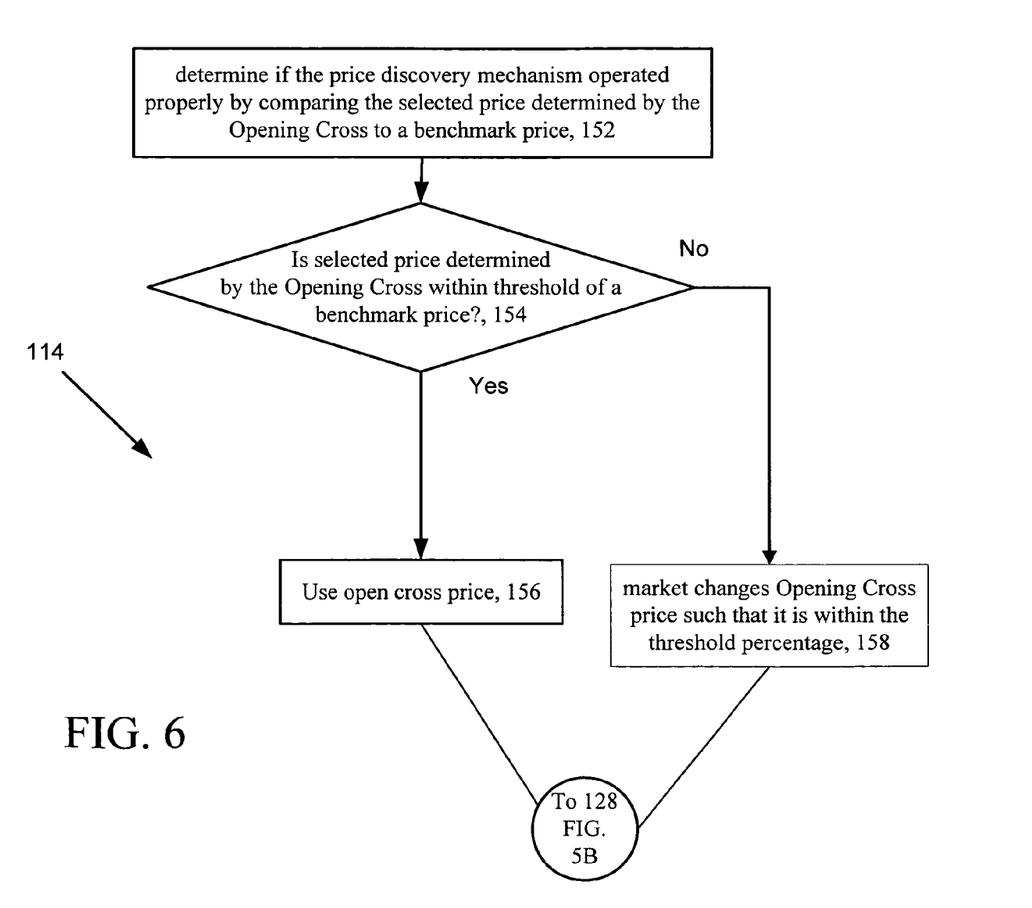
FIG. 6 is a flow chart that shows a price check process used in opening cross process of FIGS. 5A-5C.

Referring to FIG. 6, the Opening Cross determines whether the price discovery mechanism at the open functioned as expected. The Opening Cross thus includes a "circuit breaker" process to protect against unusual occurrences The Opening Cross determines 152 if the price discovery mechanism operated properly by comparing the selected price determined by the Opening Cross to a benchmark price. Several benchmark prices can be determined. One such benchmark is a benchmark value representing market conditions approximately five seconds prior to the open, which is a Volume Weighted Average Price ("VWAP") based on the market executions over the period from 9:29:55 to 9:30. If the expected Opening Cross price is within a preset boundary of the benchmark price 154, the cross will occur 156 at the expected Opening Cross price and return to 126 (FIG. 5C). If the expected Opening Cross price is outside a preset boundary ("Threshold Percentage") of the benchmark, the market will change 158 the Opening Cross price such that it is within the threshold percentage and return to 126 (FIG. 5C).

This change will happen automatically prior to execution of the Opening Cross, and will not involve any human intervention. The modified price will then follow the principles for ordinary crosses: maximizing volume executed, minimizing the imbalance of On Open orders, and minimizing the distance from the final pre-opening NASDAQ bid-ask midpoint. All unexecuted shares from On Open orders will be canceled.

The Threshold Percentage can be set by market officials in advance and communicated to members. The market may adjust the Threshold Percentage based on experience with the Opening Cross process and for unusual market conditions, such as certain options and derivatives expiration days that are heavily affected by the opening price of market securities. The threshold will be set so that use of the bounds is rare. Such changes will occur in advance and will be communicated to members.

A number of embodiments of the invention have been described. Nevertheless, it will be understood that various modifications may be made without departing from the spirit and scope of the invention. For example, the trading times discussed herein are based on a market that opens at 9:30. Other opening times for a market could be used and in addition, the times specified herein could be modified. Accordingly, other embodiments are within the scope of the following claims.

What is claimed is:

1. A method, executed in a computer system, for opening an electronic market for trading of a security, comprising:
    receiving by the computer system eligible orders and quotes for the security traded in the electronic market;
    disseminating an order imbalance indicator message indicative of predicted trading characteristics of the security at the open of trading the order imbalance indicator message including, an indicative clearing price range at which the market open would occur at the time that the indicator message is disseminated, and a percent by which that indicative clearing price range varies from an inside match price;
    algorithmically determining by the computer system a price or prices at which the maximum shares would be executed;
    determining which price of those algorithmically determined prices, would minimize any imbalance of eligible orders without trading through an eligible limit order, as a determined opening price; and
    executing at least some of the eligible orders at the determined opening price.

2. The method of claim 1 wherein eligible orders comprise market on open orders, limit on open orders, imbalance only orders, extended day orders, and Early and Late regular hours orders.

3. The method of claim 1 wherein executing provides an electronic clearing opening of the electronic market with order types that are entered only for the opening of the market.

4. The method of claim 1, further comprising:
    determining by the computer system whether the determined opening price is within a threshold amount of a benchmark price.

5. The method of claim 4 wherein the benchmark is a Volume Weighted Average Price ("VWAP") based on the market executions over the period from 9:29:55 to 9:30.

6. The method of claim 4 wherein when the determined opening price is outside the preset boundary of the benchmark, the market will change the determined price such that it is within the boundary.

7. The method of claim 1, further comprising periodically calculating by the computer system the order imbalance indicator over a series of time periods.

8. The method of claim 7 wherein the order imbalance indicator at a first of the series of time periods comprises at least one of:
an Inside Match Price,
the number of shares paired at the Inside Match Price;
order imbalance at the Inside Match Price;
the buy/sell direction of that imbalance at the Inside Match Price.

9. The method of claim 1 wherein the method of claim 1 is used to determine prices for selected securities in the market and for other securities the market uses a different opening method to determine prices for those other securities.

10. The method of claim 9 wherein the different opening method comprises:
determining by the computer system all eligible orders for execution such that those orders would not lock or cross the market will be on a order book structure stored in the computer system and all other eligible orders will be an "In Queue" state queue stored in the system; and
executing by the computer system "In Queue" orders, including market orders, in strict time priority order regardless of order type.

11. The method of claim 9 wherein the different opening method comprises:
activating by the computer system limit orders that have a time-in-force of Day or Good Till Canceled (GTC) and placing those limit orders whose limit price does not lock or cross the book on the order book with remaining orders whose limit price does lock or cross the book being placed in an "In Queue" state queue stored in the computer system in strict time priority;
activating "reverse Pegged" orders and placing those reversed pegged orders whose limit price does not lock or cross the book on the order book stored in the computer system with remaining reversed pegged orders whose limit price does lock or cross the book being placed in an "In Queue" state queue stored in the computer system in strict time priority; and
activating regular Pegged orders in strict time priority to add shares of the security to the order book at the prices in the order book.

12. The method of claim 1 wherein after executing at least some of the orders, the method further comprises:
computing by the computer system a new inside quote price based at least in part on prices of ECN quotes, and orders that do not participate in the opening.

13. The method of claim 12 wherein computing a new inside quote comprises:
determining by the computer system the new inside quote price based at least in part on prices of quotes ECN quotes, DAY and GTC orders that did not execute during the opening to add to those orders and quotes to the order book stored in the computer system.

14. A system that is part of an electronic market for trading of securities, the system comprising:
a server computer system comprising a processor and memory for executing a computer program product:
a computer readable medium for storing a computer program product, comprising instructions for causing the server system to:
receive eligible orders and quotes for the security traded in the electronic market;
disseminate an order imbalance indicator message indicative of predicted trading characteristics of the security at the open of trading the order imbalance indicator message including an indicative clearing price range at which the market open would occur at the time that the indicator message is disseminated, and a percent by which that indicative clearing price range varies from an inside match price;
algorithmically determine a price or prices at which the maximum shares would be executed;
determine which price of those algorithmically determined prices, would minimize any imbalance of eligible orders without trading through an eligible limit order, as the determined opening price; and
execute at least some of the eligible orders at the determined opening price.

15. The system of claim 14 wherein the eligible orders comprise market on open orders, limit on open orders and imbalance only orders, extended day orders, and Early and Late regular hours.

16. The system of claim 14 wherein the instructions further comprise instructions to:
determine whether the determined opening price is within a threshold amount of a benchmark price.

17. The system of claim 14 wherein when the determined price is outside the preset boundary of the benchmark, the system changes the determined price such that it is within the boundary.

18. The system of claim 14, further comprising periodically calculating by the computer system the order imbalance indicator over a series of time periods, the order imbalance indicator comprises at least one of:
an Inside Match Price,
the number of shares paired at the Inside Match Price;
order imbalance at the Inside Match Price.

19. The system of claim 14 wherein after the system executes at least some of the orders, the system computes a new inside quote price based at least in part on prices of ECN quotes, and orders that do not participate in the opening.

20. A computer program product residing on a computer-readable medium for use in an electronic market for trading of securities comprises instructions for causing a system to:
receive eligible orders and quotes for the security traded in the electronic market;
disseminate an order imbalance indicator message indicative of predicted trading characteristics of the security at the open of trading the order imbalance indicator message including an indicative clearing price range at which the market open would occur at the time that the indicator message is disseminated, and a percent by which that indicative clearing price range varies from an inside match price;
algorithmically determine a price or prices at which the maximum shares would be executed;
determine which price of those algorithmically determined prices, would minimize any imbalance of eligible orders without trading through an eligible limit order, as the determined opening price; and
execute at least some of the eligible orders at the determined opening price.

21. The computer program product of claim 20 wherein the eligible orders comprise imbalance only orders.

22. The computer program product of claim 20 wherein the eligible orders comprise market on open orders, limit on open orders and imbalance only orders, extended day orders, and Early and Late regular hours.

23. The computer program product of claim 20 wherein the instructions further comprise instructions to:
 determine whether the determined opening price is within a threshold amount of a benchmark price.

24. The computer program product of claim 20 wherein when the determined price is outside the preset boundary of the benchmark, the system changes the determined price such that it is within the boundary.

25. The computer program product of claim 20, further comprising periodically calculating by the computer system the order imbalance indicator over a series of time periods, the order imbalance indicator comprises at least one of:
 an Inside Match Price,
 the number of shares paired at the Inside Match Price;
 order imbalance at the Inside Match Price;
 the buy/sell direction of that imbalance at the Inside Match Price.

26. The system of claim 14 wherein selected algorithmically determined opening prices are determined for selected securities in the market and for other securities the market uses a different opening method to determine opening prices for those other securities.

27. The computer program of claim 20 wherein selected algorithmically determined opening prices are determined for selected securities in the market and for other securities the market uses a different opening method to determine opening prices for those other securities.

* * * * *